United States Patent Office 3,049,475
Patented Aug. 14, 1962

3,049,475
FERMENTATION PROCESS FOR PRODUCING NOVOBIOCIN
Charles H. Stammer, New Brunswick, and Ian M. Miller, Liberty Corner, N.J., assignors to Merck & Co., Inc., Rahway, N.J., a corporation of New Jersey
No Drawing. Filed Apr. 19, 1956, Ser. No. 579,129
6 Claims. (Cl. 195—80)

This invention is concerned with methods of obtaining novobiocin fermentation broths of enhanced potency. More particularly, it is concerned with carrying out the cultivation of *Streptomyces spheroides* in the presence of minor amounts of p-aminosalicylic acid.

Novobiocin (the generic name for an antibiotic, the proprietary name for one brand of which is "Cathomycin"), is producing by growing, under controlled conditions, a previously unknown species of microorganism which has been named *Streptomyces spheroides*. This microorganism, which was isolated from a sample of soil from an old sod pasture in Vermont, has been designated *Streptomyces spheroides* MA–319 in the culture collection of Merck & Co., Inc., Rahway, New Jersey. A viable culture thereof has been deposited with the Fermentation section of the Northern Utilization Research Bureau, United States Department of Agriculture at Peoria, Illinois, and added to its permanent culture collection as NRRL 2449.

Aqueous media that are suitable for aerobic cultivation of strains of *Streptomyces spheroides* to produce novobiocin are, generally stated, those suitable for the production of other antibiotics by cultivation of other Streptomyces organisms. Such media contain sources of assimilable carbon, such as a carbohydrate; of assimilable nitrogen, such as corn steep liquor, casein hydrolysate, distiller's solubles, or the like; and inorganic salts, including trace metals, required for proper metabolism of the microorganism. Preferably, the medium is maintained at a temperature of 24°–28° C. during the period, usually about one to seven days, in which the microorganism is cultivated, and aeration is provided for optimum growth of the organism and production of novobiocin. Fermented broths produced in this manner have an activity of about 150–2000 novobiocin units, as hereinafter defined, per milliliter, and the fermentation broth solids have an activity of the order of about 2.25 novobiocin units per milligram of solids. The antibioactive material can be purified and recovered in purer form by any of several procedures.

For example, the whole broth may be filtered at the hydrogen-ion concentration of harvest, usually about pH 7.0–8.0; the filtrate may be extracted at a hydrogen-ion concentration within the acid range below about pH 7.0 with a substantially neutral, merely slightly polar, water immiscible, liquid organic solvent soluble in cold concentrated sulfuric acid and in cold syrupy orthophosphoric acid; and the organic extract may be extracted with an aqueous alkaline buffer solution at a hydrogen-ion concentration of at least pH 8.5 to obtain a solution containing a substantial concentration of novobiocin salt. The two extraction steps may be repeated in succession, to obtain an even more concentrated solution from which novobiocin-active material may be recovered by acid precipitation. The product thus obtained may be purified by recrystallization from an aqueous acidic alcohol solution.

This new antibiotic, novobiocin, is comprised of the elements carbon, hydrogen, nitrogen, and oxygen, combined in a substance having approximately the formula $C_{31}H_{36}N_2O_{11}$ according to present data. It reacts as an acidic organic compound toward and is easily soluble in alkaline reagents, such as aqueous solutions of alkali-metal hydroxides, carbonates, and bicarbonates; it has two base-binding groups and can be precipitated from its solution in alkalis by acidification. It is soluble in the lower alkanols, lower aliphatic ketones, acetic acid, ethyl acetate, dioxane; and it is insoluble or merely sparingly soluble in ether, benzene, chloroform, carbon tetrachloride ethylene dichloride, water, and hydrochloric acid.

Substantially pure novobiocin has been obtained in two crystalline modifications; a form crystallizing as rosettes and melting at about 152°–154° C., and another form having the appearance of flat needles, melting at about 170°–172° C. Each of these crystalline forms of the antibiotic can be converted into a so-called normalized form, which may be an amorphous or submicrocrystalline form, by dissolving the crystals in acetone, quickly adding to this solution a relatively large volume of petroleum ether, and recovering the precipitated normalized material by filtration.

Alkaline aqueous solutions of novobiocin and mineral oil suspensions of the normalized form of the antibiotic exhibit characteristic absorption, the former in the ultraviolet and the later in the infrared portions of the radiation spectrum. A solution of substantially pure novobiocin in 0.1 N aqueous sodium hydroxide exhibits a characteristic ultraviolet absorption peak at 3070 A. This absorption peak is indicative of a substantially pure material having a specific absorbency of 600, measured at this wavelength, using a solution containing one gram of pure novobiocin per hundred milliliters of the solution, contained in a cell having an absorption path of one centimeter. A solution of pure novobiocin in 0.1 N aqueous-methanolic hydrochloric acid exhibits a characteristic ultraviolet absorption peak at 3240 A. with $$E_{1\,cm.}^{1\%}\ 390$$

A mineral oil suspension of substantially pure normalized novobiocin exhibits characteristic infrared absorption peaks at the following wavelengths, expressed in microns: 5.8–6.0 (broad), 6.10, 6.21, 6.30, 6.49, 6.63, 7.4–7.6 (broad shoulder), 7.78, 7.96, 8.27 (weak), 8.60 (shoulder), 8.7 (shoulder), 9.13, 9.40, 10.0–10.1 (broad), 10.28, 10.60 (broad), 12.0–12.30 (broad), 12.60–12.75 (broad), 13.07, and 13.39.

Novobiocin units are related to the microbiological activity of substantially pure crystalline novobiocin; the microbiological activity of substantially pure crystalline novobiocin has been arbitrarily taken as 5,000 units per milligram, as determined by standard cupplate diffusion methods, using *Bacillus subtilis* ATTC 12,432 as the test organism.

In brief, by this procedure, a culture of *B. subtilis* ATTC 12,432 is cultivated on brain heart infusion agar slants (Difco Manual, 9th edition (pages 90, 91) for 24 hours at 37° C. and is then stored at 5° C. for periods no longer than a month. For preparation of spores, an inoculum is prepared by adding 5 ml. of sterile, distilled water to a freshly cultivated *B. subtilis* slant. The cells are aseptically scraped from the slant, mixed well, and transferred to 50 ml. of sterile, distilled water in an Erlenmeyer flask. Two ml. of the bacterial suspension is added, as an inoculum to a Roux bottle containing a medium consisting of 3 percent soybean meal, 0.2 percent NaCl, 0.4 percent distillers' solubles, 0.8 percent dextrose, and 2.0 percent agar. After incubation for 7 days at 37° C. the bacterial growth obtained is suspended in 50 ml. of sterile, distilled water and pasteurized at 65° C. for 30 minutes. Four ml. of a 1:50 dilution of this spore suspension is used per liter of assay medium containing 0.5 percent peptone, 0.3 percent beef extract, 0.3 percent yeast extract, and 1.5 percent agar at a pH of 5.9–6.1.

Fifteen ml. quantities of seeded medium are distributed into deep flat-bottom Petri dishes.

Six stainless steel cylinders are placed on the seeded agar. Three alternate cylinders are filled with standard solution of 4 micrograms of novobiocin/ml. (equivalent to 20 units of novobiocin/ml.), and three with the unknown solution diluted approximately to the same potency with M/20 phosphate buffer at pH 6.0. A daily standard curve is prepared with pure novobiocin diluted to various concentrations ranging from 2 to 16 $\mu$g./ml.

After 18 hours' incubation at 28° C., diameters of the inhibitory zones of the unknown and the standard solutions on each plate are measured. The potency of the unknown is determined from a nomograph based on the degree of response at various concentrations established from the daily standard curve.

Novobiocin is optically active, $[\alpha]_D^{25} = -27°$ (C., 1 in 1 N sodium hydroxide) and $[\alpha]_D^{25} = -44°$ (C., 1 in pyridine).

Novobiocin is active in inhibiting growth of gram-positive microorganisms primarily, although it also exhibits some activity against gram-negative microorganisms. It inhibits growth of the following organisms, inter alia:

*M. pyogenes* var. *albus*
*M. pyogenes* var. *aureus*
*Diplococcus pneumoniae*
*Corynebacterium diphtheriae* type gravis
*Corynebacterium diphtheriae* type intermedius
*Corynebacterium diphtheriae* type mitis
*Corynebacterium xerose*
*Corynebacterium renale*
*Neisseria meningitidis*
*Sarcina lutea* (VD)
*M. pyogenes* var. *aureus* resistant to aureomycin
*M. pyogenes* var. *aureus* resistant to streptomycin-streptothricin
*M. pyogenes* var. *aureus* resistant to penicillin Novobiocin salts also have antibiotic activity. For example, the sodium salt of novobiocin, when tested by the agar streak dilution assay, was found to inhibit the growth of various strains of *M. pyogenes* var. *aureus M. pyogenes* var. *albus, Neisseria meningitidis* (No. 274), and *Sarcina lutea* (VD) at concentrations below 0.5 mcg. per ml. Other microorganisms are also affected by novobiocin or its salts in varying degrees.

It is an object of the present invention to provide a method of obtaining fermentation broths having enhanced novobiocin activity. Other objects will be apparent from the detailed description of the invention hereinafter provided.

In accordance with the present invention, it is now found that the addition of small amounts of p-aminosalicylic acid in fermentation mediums employed for the cultivation of *Streptomyces spheroides* acts as a precursor and results in the production of fermentation broths having enhanced novobiocin activity.

The optimum concentration of p-aminosalicylic acid in the medium will depend, in part, upon the particular fermentation medium used. In general, it is found that concentration of p-aminosalicylic acid in excess of about 5 mg./ml. in the fermentation medium inhibits the growth of the microorganism. Thus, in using p-aminosalicylic acid or its salts as a precursor in the synthetic medium such as proline-glucose mediums, it is found that concentration greater than about 5 mg. per ml. cannot be used since the presence of larger amounts of the p-aminosalicylic acid inhibits the formation of the antibiotic. Usually, it is found that with such synthetic mediums a concentration of about 1 mg. per ml. is satisfactory and results in broths having greatly enhanced novobiocin activity.

In carrying out the processes of the present invention, it is found that the p-aminosalicylic acid or its salt is most conveniently added directly to the fermentation medium prior to sterilization and cultivation of the medium with the novobiocin-producing strain of *Streptomyces spheroides*. Alternatively, the p-aminosalicylic acid or its salt can be added to the sterilized medium aseptically either before or during the actual fermentation period. Thus, an aseptic solution of p-aminosalicylic acid in water or another suitable solvent, such as an alcohol, can be sterilized by passage through a porcelain candle of the Selas type prior to incorporation in the sterilized nutrient medium. As indicated above, this addition of the sterilized precursors can be effected either prior to the start of the fermentation or during the actual cultivation of the microorganism.

The following example is presented as an illustrative embodiment of the present invention.

EXAMPLE

A yeast extract-dextrose agar adjusted to a pH of about 7.0 was sterilized, cooled, and inoculated with *Streptomyces spheroides* NRRL 2449 from a soil tube. The yeast extract-dextrose plants were then incubated at 28° C. for about seven days until the cultures were well sporulated. The vegetative spores were then stored at 4–8° C. until needed. The yeast extract-dextrose agar was made up in tap water and contained the following:

| | Percent |
|---|---|
| Difco yeast extract | 1.0 |
| Dextrose | 1.0 |
| $MgSO_4 \cdot 7H_2O$ | 0.05 |
| Agar | 2.0 |

.67 M $Na_2HPO_4$—$KH_2PO_4$ (pH 7) 2.0% (by volume).

The further development of inoculum was continued in a distiller's solubles medium containing 3% of distiller's solubles and 2.0% of dextrose in tap water; the pH of the medium being adjusted to about 7.0–7.2. Forty ml. of this medium was placed in 250 ml. Erlemeyer shake flasks and the flasks and contents sterilized by heating in an autoclave at about 120° C. for about twenty minutes. After cooling, the sterilized flasks are inoculated by transferring a heavy conidal inoculum from the yeast extract-dextrose slants. The flasks and contents were then incubated at 28° C. for 3 days on a rotary shaker (220 r.p.m.).

The medium, a proline-glucose medium, for the production of novobiocin was prepared by dissolving the following in tap water:

| | Percent |
|---|---|
| L-proline | 1.0 |
| Glucose | 1.0 |
| NaCl | 0.5 |
| $K_2HPO_4$ | 0.2 |
| $MgSO_4 \cdot 7H_2O$ | 0.1 |
| $CaCl_2 \cdot 2H_2O$ | 0.04 |
| $FeSO_4 \cdot 7H_2O$ | 0.02 |
| $ZnSO_4 \cdot 7H_2O$ | 0.01 | and adjusting the solution to a pH of 7.0–7.2 before use.

Forty ml. of this medium was dispensed in 250 ml. Erlenmeyer shake flasks, and the flasks and contents sterilized by heating in an autoclave at about 120° C. for about twenty minutes. The cooled sterilized medium was then inoculated with one ml. of vegetative inoculum prepared in the distiller's solubles medium described above. The flasks were set up in triplicate and were incubated at 25° C. in a rotary shaker (220 r.p.m.) for seven days; aliquots being removed at six days. These samples, plus the seven day samples, were assayed for novobiocin activity by diluting them in 0.05 M phosphate buffer (pH 6) to contain about 4 micrograms per ml. of novobiocin and determining the growth inhibition of *Bacillus subtilis* in the cup-plate assay in comparison with novobiocin as a standard. The dry weight of the produced mycelium was also determined on the seven day samples by centrifuging an aliquot of the broth, resuspending the solids in distilled water, recentrifuging and drying the solids to a constant weight at 105° C.

The precursor activity of p-amino salicylic acid in increasing the antibiotic production by fermentation was demonstrated by adding varying amount of this compound to such shake flask fermentations. The p-aminosalicylic acid was added to the shake flask containing the 40 ml. of proline-glucose medium, and the resulting medium was sterilized, inoculated, and incubated as described above.

The effect of this added p-aminosalicylic acid in increasing the potency of the fermented broth is illustrated by the following table showing the microbiological potency and mycelium weights of typical fermentation broths supplemented by the addition of p-aminosalicylic acid (PAS) in comparison with the unsupplemented or control fermentation broths:

Experiment No. 1
PROLINE-GLUCOSE MEDIUM

| Medium | Potency, mcg/ml. | Mycelium Weight, mg./ml. |
|---|---|---|
| Control | 161 | 17.0 |
| Control+1 mg/ml. of PAS | 321 | 14.6 |

Experiment No. 2
PROLINE-GLUCOSE MEDIUM

| Medium | Potency, mcg/ml. | Mycelium Weight |
|---|---|---|
| Control | 190 | 14.1 mg./ml. |
| Control+mg./ml. of PAS | 396 | 13.7 mg./ml. |
| Control+0.5 mg./ml. of PAS | 270 | 16.8 mcg./ml. |

Various changes and modifications may be made in carrying out the present invention without departing from the spirit and scope thereof. Insofar as these changes and modifications are within the purview of the annexed claims, they are to be considered as part of our invention.

What is claimed is:

1. In the process of producing novobiocin broths of enhanced activity by fermentation, the improvement which comprises cultivating a novobiocin-producing strain of *Streptomyces spheroides* in an aqueous nutrient medium containing a precursor from the group consisting of p-aminosalicylic acid and salts of p-aminosalicylic acid.

2. The process of claim 1 in which the novobiocin-producing strain is *Streptomyces spheroides* NRRL 2449.

3. The process of claim 1 in which the concentration of p-aminosalicylic acid is less than about 5 mgs. per ml. of fermentation medium.

4. The process of producing novobiocin fermentation broths of enhanced potency which comprises cultivating *Streptomyces spheroides* NRRL 2449 in an aqueous nutrient medium containing L-proline, glucose, inorganic salts necessary for the growth of said organism, and a precursor from the group consisting of p-aminoalicylic acid and salts of p-aminosalicylic acid.

5. The process of claim 4 in which the amount of p-aminosalicylic acid is less than about 5 mgs. per ml.

6. The process of claim 4 in which the amount of p-aminosalicylic acid is about 1 mg. per ml.

References Cited in the file of this patent

Wallick et al.: Antibiotics Annual, 1955–1956, pp. 909–917, RS–161–A57.

Welch et al.: Antibiotics and Chemotherapy, vol. 5, December 1955, pp. 670–673, RM–663 A1A6.

Dietz et al.: Antibiotics and Chemotherapy, vol. 6, No. 2, February 1956, pp. 135–142, RM–663 A1A6.

Pridham: Fourth Ann. Symposium on Antibiotics, October 1956, Paper No. 125.

Erickson: Ann. Review of Microbiology, vol. 20, No. 4, pp. 23–54.

Ann. N. Y. Acad. Sci., vol. 60, Art. 1, 1954, pp. 4–5, 136.

Baldacci: Archiv für Mikrobiologie, 1954, vol. 20, No. 4, pp. 347–357.